United States Patent [19]

Hohlfeld

[11] Patent Number: 4,590,241
[45] Date of Patent: May 20, 1986

[54] POLYMER BLENDS COMPATIBILIZED WITH REACTIVE POLYMERS EXTENDED WITH MISCIBLE NONREACTIVE POLYMERS

[75] Inventor: Ronald W. Hohlfeld, Midland, Mich.

[73] Assignee: The Dow Chemical Company, Midland, Mich.

[21] Appl. No.: 681,396

[22] Filed: Dec. 13, 1984

[51] Int. Cl.$^4$ .................. C08L 71/04; C08L 39/04; C08L 23/08; C08L 35/06

[52] U.S. Cl. ........................... 525/132; 525/68; 525/73; 525/150; 525/186; 525/204

[58] Field of Search ............ 525/931, 68, 132, 204, 525/239

[56] References Cited

U.S. PATENT DOCUMENTS

| | | | |
|---|---|---|---|
| 2,897,182 | 7/1959 | Benneville et al. | 525/204 |
| 3,236,914 | 2/1966 | Murdock et al. | 525/931 |
| 3,361,851 | 1/1968 | Gowan | 525/132 |
| 3,383,435 | 5/1968 | Cezek | 525/132 |
| 3,488,307 | 1/1970 | Walus et al. | 525/204 |
| 3,509,235 | 4/1970 | Riemhofer et al. | 525/204 |
| 3,786,105 | 1/1974 | Nakashio et al. | 525/132 |
| 4,508,869 | 4/1985 | Keskey et al. | 524/808 |

*Primary Examiner*—Carmen J. Seccuro
*Attorney, Agent, or Firm*—D. L. Corneglio

[57] ABSTRACT

Thermoplastic polymer blends containing normally incompatible polymers prepared by incorporating into one polymer repeating units containing pendant cyclic iminoether groups to form a first reactive polymer and another reactive polymer having coreactive groups to form a second reactive polymer which is capable of reacting with said first reactive polymer to form linkages between the polymers wherein said blend is characterized by said first or second reactive polymer being blended or extended with miscible polymer(s) to form a reactive blend thereof.

12 Claims, No Drawings

POLYMER BLENDS COMPATIBILIZED WITH REACTIVE POLYMERS EXTENDED WITH MISCIBLE NONREACTIVE POLYMERS

BACKGROUND OF THE INVENTION

This invention relates to a compatible blend of two or more normally incompatible polymers. More particularly, this invention relates to blends of a first reactive polymer or polymer blend containing pendant cyclic iminoether groups and another reactive polymer or polymer blend containing groups which react with cyclic iminoether groups to form linkages between the reactive polymers or polymer blends. The subject invention is characterized by having at least one of the reactive polymers extended with a miscible but nonreactive polymer or polymers to form a reactive blend thereof.

It is often desirable to prepare blends of polymers which maximizes the desirable properties but minimizes the deficiencies of the component polymers. For example, monovinylidene aromatic polymers, such as polystyrene, have desirable properties such as being easily thermoformed and have good mechanical characteristics. However, such monovinylidene aromatic polymers have certain undesirable properties such as poor environmental stress crack resistance (ESCR). On the other hand, polyolefins such as polyethylene or polypropylene have relatively good ESCR and low temperature properties but are not as readily thermoformed as desired. It would be highly desirable to provide a blend of a monovinylidene aromatic polymer and other polyolefins which exhibits the desirable properties but not the deficiencies, of the component polymers. Similarly, it is often desirable to blend other polymers in like manner.

Unfortunately, however, such blends often do not exhibit these expected properties. Many such blends exhibit properties which are, in fact, far worse than those of the component polymers due to an incompatibility of the polymers. For example, monovinylidene aromatic polymers such as polystyrene and rubber modified polystyrene are notably incompatible with many polymers which would otherwise be advantageously blended therewith. Thus, most blends containing polystyrene and like polymers exhibit poorer than expected properties.

Various methods have been proposed to prepare blends of normally incompatible polymers. Generally, these methods have focused on the use of grafting techniques or the use of a third component, a compatiblizing agent, in the blend. For example, in U.S. Pat. Nos. 4,386,187 and 4,386,188 it is taught to prepare blends of polyolefins and a polystyrene using a styrene/butadiene/styrene block copolymer. Compatibilizing agents which are ethylene/vinylacetate copolymers, ethylene/acrylic acid ester copolymers and ethylene/methacrylic acid ester copolymers have also been taught for use in preparing blends of polystyrene and polyolefins (see Japanese Patent Announcement Kokai No. 48-43031/1973). Other such compatibilizing agents are taught in, for example, U.S. Pat. Nos. 4,188,432; 4,020,025; British Pat. No. 1,363,463 and German Pat. No. 241,375.

Unfortunately, these approaches to preparing compatible polymer blends often do not yield entirely satisfactory results. In many instances, the type and proportion of the component polymers which can be blended using these techniques is quite narrowly restricted. In addition, the inclusion of an additional component in the blend often has an adverse effect on the properties of the blend. However, the blend achieved is still not as compatible as desired and accordingly the properties of the blend are sometimes not as good as expected.

Accordingly, it would be desirable to provide a blend of normally incompatible polymers in which improved compatibilization of the polymers and improved properties of the blend are achieved. It is further desirable to be able to maximize the type and proportion of the desirable component polymers in any particular blend.

It has been discovered that in addition to reactive polymers which compatibilize normally incompatible polymers that unexpectedly these reactive polymers can be extended with miscible nonreactive polymers without a loss in blend compatibility.

SUMMARY OF THE INVENTION

In one aspect, the invention is a compatible blend of normally incompatible polymers. The blend of the invention comprises a first thermoplastic reactive polymer containing a compatibilizing amount of repeating units containing a pendant cyclic iminoether group and a second thermoplastic reactive polymer containing a compatibilizing amount of repeating units containing a coreactive group which is capable of reacting with said cyclic iminoether group to form a linkage between said first and second reactive polymer wherein said blend is characterized by said first and/or said second thermoplastic reactive polymer being extended with a respective miscible nonreactive polymer(s). Said first and second reactive polymer are normally incompatible when said first and second polymer do not contain such cyclic iminoether and coreactive groups.

The blends of this invention are a compatible (or miscible) blend of the component polymers. Accordingly such a blend exhibits the desirable properties of each of the component polymers with no significant decrease in properties due to incompatibility. A significant advantage of this blend is that the amount of reactive polymers which are employed is reduced by extending them with miscible nonreactive polymers without decreasing the compatibility of the normally incompatible polymers.

In addition, the blends of this invention can be prepared using wide ranges of reactive polymer components as well as a variety of other types of miscible polymer components. By varying the proportions of cyclic imino-ether and coreactive groups employed in the reactive polymers and by varying the type and amount of miscible nonreactive polymer blended with the respective reactive polymer, the properties of the resultant blend can be engineered to many desired end uses. Further, the increased flexibility in the amount of reactive polymers which need to be employed in the total blend can provide lightly crosslinked thermoplastic blends or highly crosslinked thermosetting blends of variable physical properties.

DETAIL DESCRIPTION OF THE INVENTION

The term "blend" as employed herein refers to those solid mixtures of two or more polymers which are commonly referred to in the art as polymer blends or polymer alloys. The terms "compatible blend" or "miscible blend" and like terms, as employed herein, are not employed in the strict sense as meaning that the blend exhibits a single glass transition temperature, but instead is used to describe a blend which exhibits properties, especially physical properties, which are essentially intermediate to those of the component polymers, or better. By contrast, an "incompatible blend" or "immiscible blend" as used herein, refers to a blend which exhibits properties which are significantly poorer than those of the individual polymers.

The subject blend or polymeric alloy generally comprises at least two "reactive polymers" which are not normally compatible. The "first reactive polymer" is functionalized with a cyclic iminoether group and the "second reactive polymer" is functionalized with a coreactive group that is capable of crosslinking with the cyclic iminoether group. At least one or, optionally, both of the reactive polymers are extended with miscible nonreactive polymer(s) to form a reactive blend thereof. The miscible nonreactive polymer can comprise the base polymer of the respective reactive polymer or any other polymer compatible with the reactive polymer. The reactive blends or reactive blend and reactive polymer may then be blended to form a new blend or alloy. For example, the cyclic iminoether functionalized polymer can be extended with a miscible nonreactive polymer to render that blend reactive. Likewise, the coreactive second polymer can be extended with polymers to produce a coreactive polymer blend. Subsequently, the iminoether functionalized blend can be reacted with the coreactive functionalized blend.

The blends of this invention contain a first reactive polymer or polymer blend having pendant cyclic iminoether groups. Said cyclic iminoether groups are present in a compatibilizing amount, i.e., an amount which is at least sufficient to render the first reactive polymer or polymer blend compatible with the other polymer or polymer blend employed herein. Of course, the amount of cyclic iminoether group which is required to compatibilize the first reactive polymer blend depends somewhat on the particular polymers employed, the relative amount thereof present in the blend and the amount of coreactive groups on the second reactive polymer. However, in general, a compatibilizing amount of said cyclic iminoether group is present when the repeating units containing said cyclic iminoether group comprise at least about 0.01 weight percent of the first reactive polymer.

Since, as described more fully hereinafter, the cyclic iminoether group apparently forms a linkage with the coreactive group on said second reactive polymer, it is readily seen that the degree of crosslinking and the molecular weight of the polymers of the blend can also be controlled with the proportion of cyclic iminoether and coreactive groups present in the blend. In fact, with control of the amounts of such groups in the blend, the blend of this invention can be prepared as desired to form a very lightly crosslinked thermoplastic blend or, conversely, a very highly crosslinked thermosetting material. However, it is only essential that the amount of cyclic iminoether group in said first reactive polymer and coreactive group on said second reactive polymer be sufficient to compatibilize themselves in the blend. Most typically, the first reactive polymer contains from about 0.01 to 10 in weight percent of repeating units containing pendant cyclic iminoether groups. More preferably, the first reactive polymer contains from about 0.1 to about 5 weight percent of such repeating units.

The cyclic iminoether groups are advantageously described by the general structure

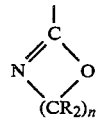

wherein each R is independently hydrogen, or an inertly substituted hydrocarbon containing 18 or fewer carbon atoms; and n is a number from about 1 to about 5. Said cyclic iminoether group can be attached to the polymer chains through any of the carbon atom in the ring. Preferably, the cyclic iminoether is a 2-iminoether, i.e., is attached to the polymer chain through the 2-carbon atom to yield a structure as represented as

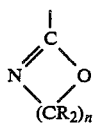

wherein R and n are as defined hereinbefore. Preferably, each R is hydrogen or lower alkyl and n is 1, 2 or 3. Most preferably, each R is hydrogen, n is 2 and the cyclic iminoether is a 2-oxazoline group. By "inertly substituted" it is meant that the referenced group contains no functional group which interferes with the polymerization or curing of the oxazoline group.

Polymers containing repeating units having pendant cyclic iminoether groups are advantageously prepared by the polymerization of a monomer mixture comprising an ethylenically unsaturated monomer containing a cyclic iminoether group. Preferably, such monomer is a 2-alkenyl-2-oxazoline wherein said alkenyl group contains from about 2 to about 8, preferably 2 to 4 carbon atoms. Most preferably, said monomer is 2-isopropenyl-2-oxazoline.

The first reactive polymer is a polymer of any monomer which (a) can be modified to contain pendant cyclic iminoether groups, or (b) can be copolymerized with a monomer which contains or can be modified to contain pendant cyclic iminoether group. In the preferred embodiment, wherein an ethylenically unsaturated cyclic iminoether is employed as a monomer, the first reactive polymer is advantageously a polymer of an addition polymerizable monomer copolymerizable therewith.

Said first reactive polymer is advantageously a polymer of a lower alkene, particularly a $C_1$-$C_8$ alkene, more particularly, ethylene or propylene as well as copolymers thereof; a conjugated diene such as butadiene or isoprene as well as copolymers thereof; a vinylidene halide such as vinylidene chloride or copolymers thereof; vinyl acetate; an ether of an $\alpha,\beta$-ethylenically unsaturated carboxylic acid such as alkyl esters of acrylic or methyl acrylic acid and copolymers thereof; a monovinylidene aromatic compound such as styrene, vinyltoluene, t-butyl styrene, vinylnaphtalene and the like; as well as polymers of diverse other addition polymerizable monomers. Ethylenically unsaturated cyclic iminoethers, in particular 2-alkenyl-2-oxazolines, generally resemble styrene in their polymerization reactions. Accordingly, as a rule of thumb, polymers of monomers which are copolymerizable with styrene will generally be usefully employed herein. Due to the polymerization reactions of 2-alkenyl-2-oxazolines and the tendency for styrenic polymers to be incompatible with a wide range of other thermoplastic materials, it is preferred that the first polymer be a polymer of a 2-alkenyl-2-oxazoline and styrene, especially 2-isopropenyl-2-oxazoline and styrene.

The coreactive group may be pendant on said second reactive polymer, may form terminal groups thereon or may be incorporated into the polymer backbone thereof. Polymers containing coreactive groups along the polymer backbone include, for example, polyamines, such as the diverse polyalkylene amines; and the like. Polymers containing terminal coreactive groups include, for example, diverse polysulfides (Thiokols), epoxy resins and polyalkylene glycols.

Most generally, said second reactive contains pendant coreactive groups which are derived from an addition polymerizable monomer containing the desired coreactive group. Preferred, are polymers having repeating units derived from $\alpha,\beta$-ethylenically unsaturated monomers containing said coreactive groups. Examples of such polymers are polymers of unsaturated carboxylic acids such as acrylic acid, methacrylic acid, itaconic acid, maleic acid and the like; unsaturated amines such as vinylamine and the like. In addition, polymers of other monomers which can be chemically modified to form pendant coreactive groups in the polymers, such as acrylonitrile, are usefully employed herein.

The second reactive polymer contains at least a sufficient amount of said coreactive groups to compatibilize itself with said first reactive polymer. As stated hereinbefore, a compatibilizing amount of said coreactive group will depend on the particular polymers employed in the blend as well as the relative proportions of said polymers in the blend and the amount of the iminoether groups present on said first reactive polymer. However, as with the iminoether group, a compatibilizing amount of the coreactive group is typically present when at least about 0.01 weight percent of the repeating units of the second reactive polymer contain coreactive groups. When said coreactive group is an integral part of the structure of the polymer backbone, as many as 100 weight percent of such repeating units in the second reactive polymer may contain coreactive groups. Typically, when said coreactive group is a pendant group incorporated into said second reactive polymer for the primary purpose of compatibilizing the blends of this invention, it is preferred that the repeating units containing said coreactive groups comprise from about 0.01 to about 10, more preferably, from about 0.1 to about 5 weight percent of said second reactive polymer.

The second reactive polymer can be one of any thermoplastic polymer which contains or can be modified to contain a coreactive group as described hereinbefore. Addition polymers such as polymers of olefins, vinyl halides, vinylidiene halides, acrylic esters, monovinylidene aromatics and the like as described hereinbefore in conjunction with a description of said first reactive polymer are useful with said second reactive polymer. In order to be useful herein the second reactive polymer is generally a copolymer of an addition polymerizable monomer which contains said coreactive group or which can be modified subsequent to polymerization to impart said coreactive group thereto. For example, any of the aforementioned addition polymers can be copolymerized with an addition polymerizable carboxylic acid to impart carboxyl groups to the polymer. Amino groups, amide groups and like coreactive groups can be imparted to the second reactive polymer in similar manner by copolymerizing a monomer mixture containing the desired proportion of an addition polymerizable monomer containing such group. Also, graft or block copolymers wherein at least one of the grafted segments or blocks contain a reactive group can be employed herein.

Polymers of certain monomers such as vinyl or vinylidene halide or acrylonitrile can be modified after the polymerization thereof to impart coreactive moieties thereto. For example, vinyl chloride can be reacted with ammonia or a primary amine to place pendant amine groups on the polymer. Similarly, acrylonitrile can be hydrogenated after its polymerization to form pendant amine groups.

Certain other polymers which normally contain coreactive groups may be employed as the second reactive polymer. For example, polymers containing repeating amine linkages, such poly(ethyleneimine) or a partially hydrolyzed poly(2-alkyl-2-oxazoline) are suitable as the other polymer herein. Other suitable polymers include those which contain amine, carboxylic acid, hydroxyl, epoxy, mercaptan, anhydrate and like groups in the polymer chain or as end groups therein.

When the second reactive polymer does not normally contain coreactive groups it is generally desirable to prepare the polymer with relatively small amounts of said coreactive groups. This is because it is usually desirable to minimize the effect of the coreactive group or monomers containing said coreactive group on the physical properties of the polymer. The presence of large amounts of certain reactive groups, such as acid groups, can cause the blend to have certain undesirable properties such as water-sensitivity, adhesion to mold and corrosion of molds.

The blends of this invention are advantageously prepared from the component polymers and/or blend thereof by conventional melt blending or solution blending techniques. Melt blending is advantageously performed by heating each polymer to a temperature about its softening point and thoroughly mixing the softened polymers. Solution blending is performed by dissolving each component polymer into a common solvent and precipitating the dissolved polymers therefrom. Melt blending is the preferred method of preparing the blends of this invention.

The order of blending the components of the subject blend can be critical. Generally, the reactive polymers and the miscible nonreactive polymers can be simultaneously blended to form the subject blend. However, where it is desirable to first form a preblend of the reactive polymers only the miscible nonreactive polymer which corresponds to the continuous phase of the preblend can be post-blended. This characteristic is the result of the reactive polymer which makes up the discontinuous phase not being able to a compatibilize its respective miscible nonreactive polymer due to the surrounding continuous phase which is composed of a noncompatible polymer which prevents the incorporation of the miscible polymer. On the contrary, the discontinuous phase does not prevent the extension of the continuous phase reactive polymer with its corresponding miscible nonreactive polymer. Preferably, the reactive polymers are either blended simultaneously with the miscible nonreactive polymers or preblended with their respective miscible nonreactive polymer.

Preferably, the reactive polymer is extended with miscible nonreactive polymer in about a five to one weight ratio or less of nonreactive polymer to reactive polymer. Higher levels of nonreactive polymer can progressively deteriorate the blend properties.

Nonreactive polymers that can be blended with the reactive polymers are those which are normally miscible (compatible) with either of the reactive polymers. For instance, reactive polystyrene (cyclic iminoether functionalized styrene) can be blended with polyphenylene oxide or a polystyrene; and a coreactive polymer such as ethylene acrylic acid can be pre-blended with a polyethylene. One preferred blend consists of reactive polystyrene and high impact polystyrene with ethylene acrylic acid and low density polyethylene.

Although it is not intended to limit the invention to any theory, it is believed that the compatibility of the blends of this invention is due to the reaction of said coreactive and iminoether groups present therein. Said coreactive and iminoether groups are believed to react to form linkages between said first and second reactive polymer, thereby overcoming the normal tendency of these polymers to resist the formation of a compatible blend.

Since crosslinkages between the polymers are present in the blends of this invention, it is apparent that presence of linking groups on each polymer can also be used as a control on the rheological and thermoplastic properties of the blends. Since the presence of such linking groups increase the molecular weight of the polymers in the blends, increasing the amounts of such linkages enables the practitioner to prepare more viscous, stronger materials by further increasing the amount of linkage in the blends. The blend can be converted into a thermosetting rather than a thermoplastic material.

Typically the formation of said linkages is achieved by the application of a moderate amount of heat to the blends. The amount of heat required is typically dependent on the particular coreactive group employed. In general, carboxylic acid groups are more reactive than amide, amine or hydroxyl groups and therefore require lower temperatures to form such crosslinkages. Usually, when a hot blending technique is employed to form the blends, the temperature at which the melt blending is performed is generally sufficient to cause the formation of linkages therein. Generally, and especially when the coreactive group is a carboxylic acid, such linkages are formed in one minute or less at the temperatures used to melt blend the polymers. It may be desirable to incorporate into the blend a catalyst which increases the rate of the reaction between the iminoether and coreactive group. Lewis acids such as zinc chloride or iron chloride are suitable as such catalysts. In addition, it may be desirable to include a plasticizer or lubricant in the blends in order to facilitate the iminoether and coreactive groups contacting each other in the blending process. However, the inclusion of either a catalyst, plasticizer or lubricant is optional herein. An important advantage of the present invention is that the formation of links in the blends of this invention is accomplished without the formation of any by-products and without the formation of ionic links. Unlike most curable systems, in which water, ammonia, or alcohol or other condensation product is formed in the curing reaction, the formation of links in this invention does not create such by-products. Accordingly, the links are formed in these blends without the undesirable formation of vaporous condensation products and without introducing such condensation products as impurities in the blends. The use of ionic crosslinks is also undesirable because such ionic crosslinks are often sensitive to pH, water and electrolytes and render the blends somewhat hydrophilic.

In one aspect, the properties of the blends can be adjusted by the amount and type of miscible nonreactive polymer blended with either of the reactive polymers. The cyclic iminoether functionalized or coreactive polymer can be effectively diluted to a desired level which will control the amount of potential crosslinking. This will also allow the use of less costly nonreactive polymers with reactive polymers to design more economic blends.

The physical and chemical characteristics of the blends prepared with both reactive and nonreactive polymers are generally proportional to the amount of polymers employed in the blends.

The process of extending the reactive polymers with compatible polymers can therefore be employed to improve the properties of the final blend. For example, where blending the reactive polymers resulted in a blend having a low melt flow rate either of the reactive polymers could be first extended with an appropriate polymer having a high melt flow rate such that the final blend had an acceptable flow rate. Therefore, the process of extending the reactive polymers allows the skilled artisan an opportunity to selectively engineer the final blend properties.

The blends of this invention may be employed in most applications for which the component polymers are suitable. Said blends may be employed to form shaped articles of all types as well as for films for packaging and like usages.

The following examples are provided to illustrate the invention but not to limit the scope thereof. All parts and percentages are by weight unless otherwise indicated.

EXAMPLE I

In a Brabender mixer heated to 280° C. at 50 ppm was melt blended the polymer blends listed in Table I. The subject reactive blends were prepared by mixing the polyphenylene oxide (PPO) and polystyrene/2-isopropenyl-2-oxazoline (SIPO) copolymer containing 1 percent by weight repeating 2-isopropenyl-2-oxazoline (IPO) units for approximately 3 minutes until a homogeneous blend was obtained. Similarly, the control blend was prepared by first blending the polyphenylene oxide and styrene until a homogeneous blend was obtained. To the first blends were then added ethylene acrylic acid (EAA) and allowed to mix for an additional 5 minutes. The torque measurements for blending the components were recorded and both blends were then compression molded and tested for melt flow rate, impact, and elongation. These measurements are recorded in Table I.

EXAMPLE II

Various polymeric alloys were prepared as in Example I. A comparison was made between unreactive polymer blends (Sample 3), the corresponding reactive polymer blends (Sample 4) and the effect of blending the miscible base polymer with the corresponding reactive polymer (Samples 5 and 6) as per the subject invention. The samples were prepared, compression molded and measured for melt flow rate, impact, elongation and tensile (Examples 3-6 only). The results are shown in Table I.

TABLE I

| Sample* | Polymer Blend (Percent Weight Polymer) | Flow (G/10 min) | Notched Izod Impact | Tensile (psi) | Elongation (percent) | Torque After 8 min |
|---|---|---|---|---|---|---|
| 1 | 35 PPO/35 SIPO (1% IPO) 30 EAA | .06 | 1.28 | — | 7.8 | 300 |
| 2** | 35 PPO/35 polystyrene 30 EAA | .24 | .55 | — | 2.0 | 130 |
| 3** | 50 polystyrene 50 LLDPE | 11.93 | .61 | 1131 | 1.7 | — |
| 4** | 50 SIPO (1% IPO) 50 LLDPE (.44% MAH) | 1.03 | 1.25 | 3425 | 8.8 | — |
| 5 | 50 SIPO (1% IPO) 25 LLDPE (.88% MAH)/ 25 LLDPE | 1.10 | 1.54 | 3866 | 8.0 | — |
| 6 | 20 SIPO (2.5% IPO)/ 30 Polystyrene 25 LLDPE (.88% MAH) 25 LLDPE | 1.05 | 1.42 | 3638 | 13.2 | — |

*Samples 1 and 2 are from Example I and Samples 3-6 are from Example II.
**Not an example of the invention.
PPO — polyphenylene oxide; SIPO — polystyrene/2-isopropenyl-2-oxazoline; IPO — 2-isopropenyl-2-oxazoline; EAA — ethylene acrylic acid; LLDPE — linear low density polyethylene; MAH — maleic anhydride.

It is readily seen from the data presented in Table I that a compatible blend can be prepared from a miscible polymer blended with either reactive polymer (Samples 1, 5 and 6). Excellent physical properties are obtained with the blend of this invention in contrast to non-compatible blends of Samples 2 and 3 which generally exhibit poorer properties.

In order to monitor the formation of linkages between the SIPO and EAA polymers, torque measurements were made for Example I while mixing the EAA and SIPO polymer in a Brabender as described hereinbefore. As a control (Sample 2), a torque measurement was made on a 35 PPO/35 Styrene/30 EAA blend. Upon adding the PPO/polystyrene blend to the softened EAA polymer, the torque exerted by the blend steadily decreased until a constant value of about 130 meter.grams was reached. The low torque value indicates that crosslinking did not occur between the PPO/styrene and EAA polymer.

In like manner, the torque exerted by the 35 PPO/35 SIPO/30 EAA blend (Sample 1), was determined. The final torque exerted in preparing the blend was higher than that of the control (Sample 2), indicating the presence of crosslinking between the PPO/SIPO reactive blend and the EAA polymer.

With respect to the results for Example II, it is seen that the physical properties of the reactive blends (Samples 5 and 6) are better than the comparative nonreactive blend (Sample 3). In addition, it is seen that Samples 5 and 6 which contained the miscible polymers preblended with the reactive polymers were not adversely affected from the inclusion of the miscible polymers in view of comparative Sample 4 which only contained reactive polymers.

What is claimed is:

1. A polymer blend comprising a first thermoplastic reactive polymer containing a compatibilizing amount of repeating units containing a pendant cyclic iminoether group and a second thermoplastic reactive polymer containing a compatibilizing amount of repeating units containing a coreactive group which is capable of reacting with said cyclic iminoether group to form a linkage between said first and said second reactive polymer wherein said first reactive polymer and said second reactive polymer are normally incompatible when said first and second polymer do not contain such cyclic iminoether and coreactive groups wherein said blend is characterized by said first and/or said second thermoplastic reactive polymer being extended with a miscible nonreactive polymer(s) in about a five to one weight ratio or less of nonreactive polymer to reactive polymer.

2. The blend of claim 1 wherein repeating units of said first reactive polymer which contains a pendant cyclic iminoether group comprise from about 0.01 to about 10 percent by weight of said first reactive polymer and the repeating unit of said second reactive polymer which contains said coreactive group comprises from about 0.01 to about 10 percent by weight of said second reactive polymer.

3. The blend of claim 2 wherein said coreactive group is an electrophilic group containing an active hydrogen.

4. The blend of claim 3 wherein said electrophilic group containing an active hydrogen is a carboxylic acid, amino or hydroxyl group.

5. The blend of claim 2 wherein the cyclic iminoether group is a 2-oxazoline group.

6. The blend of claim 1 wherein said miscible polymer(s) is the base polymer of the respective reactive polymer with which said miscible polymer(s) is blended.

7. The blend of claim 1 wherein said first reactive polymer is a copolymer of styrene and a 2-alkenyl-2-oxazoline and said second reactive polymer comprises a polymer of ethylene and an $\alpha,\beta$-ethylenically unsaturated carboxylic acid.

8. The blend of claim 7 wherein said first reactive polymer is a copolymer of styrene and 2-isopropenyl-2-oxazoline and said second polymer is a copolymer of ethylene and acrylic acid.

9. The blend of claim 1 wherein said first reactive polymer is a polymer of styrene and a 2-alkenyl-2-oxazoline and said second reactive polymer comprises a polymer of vinylchloride and an $\alpha,\beta$-ethylenically unsaturated carboxylic acid.

10. The blend of claim 1 wherein said first reactive polymer is a polymer of styrene and a 2-alkenyl-2-oxazoline which is extended with polyphenylene oxide.

11. The blend of claim 10 wherein said first reactive polymer is a polymer of styrene and a 2-alkenyl-2- oxazoline which is extended with polyphenylene oxide and said second reactive polymer comprises a polymer of ethylene and an α,β-ethylenically unsaturated carboxylic acid.

12. The blend of claim 11 wherein said 2-alkenyl-2-oxazoline is 2-isopropenyl-2-oxazoline and said polymer of ethylene and an α,β-ethylenically unsaturated carboxylic acid is ethylene/acrylic acid.

* * * * *